April 6, 1971 KYONGMIN KIM ET AL 3,573,978

METHOD OF PRODUCING LAYERS OF THE INTERMETALLIC SUPERCONDUCTING COMPOUND NIOBIUM TIN ($Nb_3Sn$) ON A CARRIER

Filed Aug. 2, 1968 2 Sheets-Sheet 1

United States Patent Office 3,573,978
Patented Apr. 6, 1971

3,573,978

METHOD OF PRODUCING LAYERS OF THE INTERMETALLIC SUPERCONDUCTING COMPOUND NIOBIUM TIN ($Nb_3Sn$) ON A CARRIER

Kyongmin Kim, Fairview, Halifax N.S., Canada, and Günther Ziegler, Erlangen, Germany, assignors to Siemens Aktiengesellschaft, Berlin, Germany Filed Aug. 2, 1968, Ser. No. 753,016
Claims priority, application Germany, Aug. 4, 1967, P 16 21 345.9
Int. Cl. C23c *11/00*
U.S. Cl. 117—227 9 Claims

ABSTRACT OF THE DISCLOSURE

Described is a method of producing layers of the intermetallic superconducting compound niobium tin ($Nb_3Sn$) upon a carrier. The method is characterized in that chlorine gas is passed across heated niobium to produce gaseous niobium chloride. Separately therefrom bromine gas is passed across heated tin to produce tin bromide. Subsequently the halogens are mixed and reduced by hydrogen upon a heated carrier in a reaction vessel.

Figure 1:
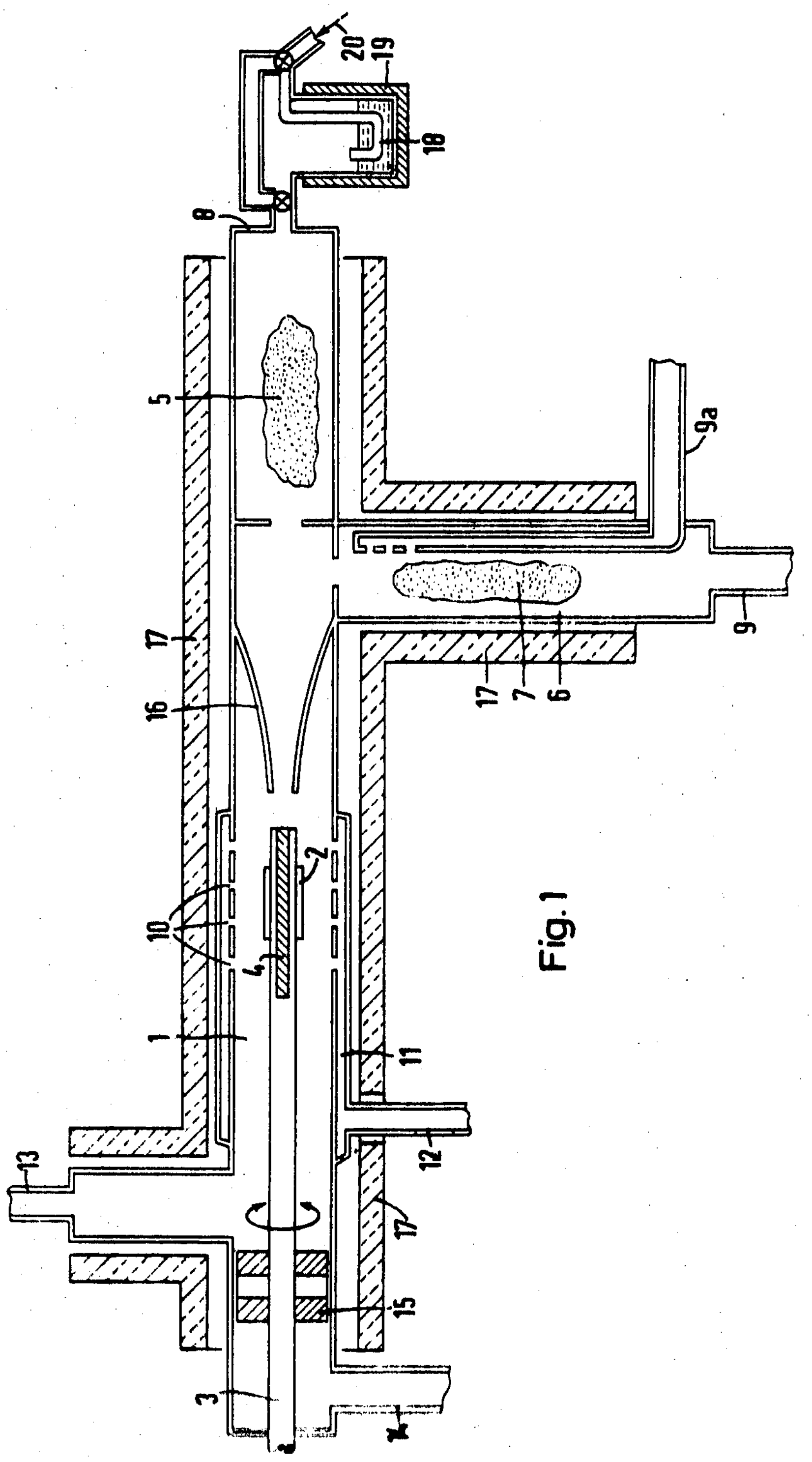

The invention relates to a method of producing layers of the intermetallic superconducting compound niobium tin ($Nb_3Sn$) on a carrier. These carriers may be comprised, e.g., of quartz or ceramic, particularly steatite, of a highly thermally stable metal or metal alloy.

Methods of producing layers of niobium tin ($Nb_3Sn$) on a carrier, through a reduction of the chlorides of niobium and tin, by means of hydrogen, on a heated carrier, are known. See, for example, the article of Hanak, Strater and Cullen in "RCA Review," Volume XXV, September 1964, pages 342 to 365, and British Patents 973,515 and 989,381. These layers are particularly suited for the production of superconducting wires and tapes which can be used, e.g., for superconducting magnetic coils to produce magnetic fields. The carriers used thereby are, among others, tapes of highly thermally stable alloys, such as those on a nickel base, known under the tradename "Hastelloy." The bromides of niobium and tin can also be utilized as indicated in "Zeitschrift für Naturforschung" Vol. 19a (1964), pages 804 to 807 (particularly the middle of page 805).

During the precipitation of the compounds from a gaseous phase, it is difficult to obtain stoichiometry. When precipitation is effected through reduction of the halogen compounds of the elements, it is deleterious if one component is more difficult to reduce than the other. When compound $Nb_3Sn$ is precipitated from the chlorides, tin chloride is substantially harder to reduce than niobium chloride. For this reason, a 12 to 15 fold excess of tin chloride is installed into the reaction vessel This has a detrimental effect on the coating of metallic substrates or even carriers of quartz or ceramic. The $Nb_3Sn$ yield is relatively small and accordingly limits, for example, the pulling velocity during the continuous coating of tapes or wires. Furthermore, there is a great possibility that for kinetic reasons tin will precipitate as a first component upon the carrier. Thus small fluctuations in the equilibrium will cause a tin-rich phase to precipitate suddenly.

The invention, therefore, has as an object finding another better reducible tin compound than tin chloride. The new tin compound should not require a large excess and should be usable with niobium chloride, to produce $Nb_3Sn$ layers.

We solve the problem by passing chlorine gas over heated niobium to form niobium chloride and, separately, passing bromine gas over heated tin to form tin bromide.

The halides are subsequently mixed and reduced by hydrogen at a heated carrier in a reaction vessel.

We have found it very favorable to produce niobium tetrachloride ($NbCl_4$) in the niobium chlorinator and tin dibromide ($SnBr_2$) in the tin brominator and to reduce these gases at a heated carrier. The reduction by hydrogen leads to niobium tin layers of good quality if the same is effected with an admixture of gaseous hydrogen chloride. It may also prove advantageous to convert partially the niobium tetrachloride, prior to mixing it with the tin bromide, into niobium pentachloride ($NbCl_5$), through an addition of gaseous chlorine. This shifts the equilibrium to $NbCl_4$ from $NbCl_3$, which $NbCl_4$ easily becomes disproportioned to $NbCl_3$ and $NbCl_5$. In this manner, disturbing wall coatings, comprised of $NbCl_3$, can be prevented in the reaction vessel used.

The niobium is preferably heated in the niobium chlorinator to temperatures between 900 and 1000° C., particularly about 950° C. Temperatures between 750 and 850° C., particularly about 800° C., are well suited for the tin in the tin brominator. The carrier on which the tin and the niobium precipitate to form the intermetallic compound niobium tin, may be heated, depending on the otherwise prevailing method conditions, to temperatures between 800 and 1100° C. Temperatures between 900 and 1000° C., particularly about 950° C., are preferred.

The $Nb_3Sn$ precipitation of the present invention may be effected on a carrier of quartz, ceramic, or Hastelloy. The carrier may be moved during the coating, in order to obtain a uniform $Nb_3Sn$ layer. A precipitation on a band or wire is naturally just as possible. The reaction vessel wherein the process is conducted comprises essentially a niobium chlorinator, a tin brominator and an $Nb_3Sn$ precipitation chamber. The niobium chloride and the tin bromide may be produced in the apparatus by introducing chloride for niobium or the bromide for tin. The niobium chloride ($NbCl_4$) and the tin bromide ($SnBr_2$) which form thereby are reduced upon the carrier in the precipitation chamber, by a flowing-in hydrogen stream and are precipitated as $Nb_3Sn$.

By use of the present invention, a stoichiometric $Nb_3Sn$ precipitation may be obtained with only a slight tin bromide excess. Previously when the same halides of tin and niobium were used, the ratio of $SnCl_2$ to $NbCl_4$ had to be approximately 4:1 to 5:1, thus with reference to the end product, $Nb_3Sn$, a 12 to 15 fold tin excess was necessary. According to the present invention, however, the ratio of $SnBr_2$ to $NbCl_4$ may be about 1.1:1. The yield of $Nb_3Sn$ with respect to tin halide is four to five times higher, in the present invention, than in the known method.

The amount of hydrogen chloride and hydrogen required according to the invention to reduce the halides corresponds approximately to that of the previously known methods. Thus, for example, ratios of approximately $HCl/NbCl_4=1$ and $H_2/NbCl_4=7.5$ are suitable.

If reaction is feared between the carrier material and the superconducting niobium tin layer, it may be preferable first to apply a niobium layer upon the carrier and only then a niobium tin layer. This may be so effected that at first niobium chloride only is reduced on the carrier and subsequently a mixture of niobium chloride and tin bromide is allowed to flow into the reaction vessel. In a discontinuous method, for example during the coating of cylinders, this can be done in sequence in one and the same coating chamber. In a continuous method, for example during the coating of tapes, bands or wires, it is preferred to guide the body provided as a carrier for the superconducting layer sequentially through two separate coating chambers. In the first chamber, coating with niobium will be effected and in the second chamber, the niobium tin layer will be formed in accordance with the present invention upon the produced niobium layer.

Figure 2:
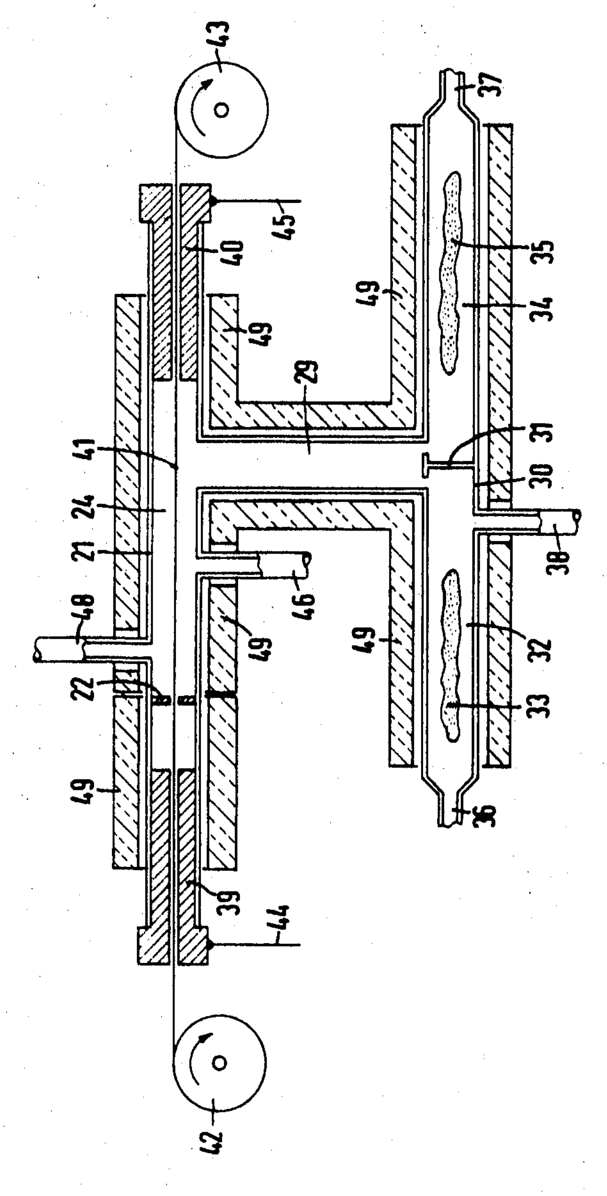

The invention will be described in greater detail by referring to embodiment examples in conjunction with the schematic drawings, wherein:

FIG. 1 shows a device for coating metallic hollow cylinders employing the method of the present invention; and FIG. 2 shows a device for coating a band-shaped carrier utilizing the method of the present invention.

In the device of FIG. 1, quartz tube 1 serves as the coating chamber. The hollow cylinder 2, which is to be coated, is mounted upon a rotatable shaft 3 and installed into the quartz tube 1. An electrically heatable heating device 4 is positioned at the end of the shaft 3 which carries the hollow cylinder. One end of the tube 1 holds the supply of tin 5 and when the device is in operation, serves as the tin brominator. A lateral tube extension 6 holds the niobium supply 7 and during the operation of the device serves as the niobium chlorinator. Niobium chloride is formed by passing chlorine gas through the tube nozzles 8 and 9 across the supply of niobium 7. Bromine gas is passed over the supply of tin 5 to form tin bromide. The wall of the quartz tube 1 is provided with openings 10 in the vicinity of the cylinder 2 which is to be coated. These openings 10 end in another quartz tube 11 which envelops a portion of quartz tube 1. The quartz tube 11 is equipped with a tube nozzle 12 which serves for the supply of the hydrogen. The quartz tube 1 also has a nozzle 13 which serves as an outlet for the exhaust gas and another nozzle 14 to supply protective gas. Escape of the reaction gases from the immediate coating chamber can be prevented by protective gas which is introduced into the tube nozzle 14 and by sealing element 15, installed in the quartz tube 1, which is provided with a nozzle-type quartz portion 16 to concentrate the gaseous niobium chloride and the gaseous tin bromide upon the carrier 2. The quartz tube 1, as well as both chlorinators, are preferably surrounded by hinged tubular furnaces 17.

The following embodiment example discloses the coating of a hollow quartz cylinder. The hollow cylinder 2 is first inserted on the shaft 3 in quartz tube 1. Thereafter the original materials niobium 7 and tin 5 are installed into the niobium chlorinator and the tin brominator respectively. The tubular furnace 17 is used to heat the wall of the coating chamber 1 to approximately 630 to 750° C., the wall of the niobium chlorinator 6 to about 950° C., and the end of the quartz tube 1, which serves as a tin brominator, is heated to about 800° C. The bromide is evaporated in the bromide evaporator 18 at approximately 60° C., by heating the furnace 19. An inert gas 20, for example argon, may be added to the bromide, if necessary in doses, by means of control valves. The hollow cylinder 2 is heated by means of a heating finger 4, to a temperature of about 900 to 980° C., particularly 950° C. The coating chamber is about 40 cm. long and has a diameter of about 4 cm.

After removing the air from the device, for example by inserting hydrogen or an inert gas, such as argon or helium, chlorine gas is introduced into the niobium chlorinator 6 via the nozzle 9 and bromine gas is passed across the heated tin supply 5, via the nozzle 8. The gaseous tin bromide which is formed thereby flows together with the niobium chloride through the nozzle 16, into the coating chamber, wherein both halides are now reduced.

At a chlorine gas throughput of 8 l./h., through the nozzle 9, and approximately the same amount of bromine gas through the nozzle 8, an approximately 50$\mu$ thick $Nb_3Sn$ layer grew in about 30 minutes on the coated cylinder 2. The niobium tin layer adhered extremly tightly to the substrate and showed a uniform structure. Its critical current density amounted to $5 \cdot 10^5$ a./cm.$^2$ in a magnetic field of 50 kilooersted. The yield of $Nb_3Sn$, with respect to the tin halide, was four to five times higher with $SnBr_2$ than with the previously used $SnCl_2$. In a test, the lattice constant amounted to 5.2890±0.0005 A., i.e. the precipitation was essentially stoichiometric.

For passing the chlorine gas across the pipe 18, the niobium tetrachloride which was formed in the niobium chlorinator 6 may be either completely or partially converted into niobium pentachloride. The amount of chlorine gas introduced through the pipe *9a* is preferably so selected that it amounts to about 10 to 20% of the amount of chlorine gas which was introduced through the nozzle 9.

FIG. 2, in another embodiment example, shows the production of a niobium tin layer on a tape of the "Hastelloy" alloy, in greater detail. The alloy is known under the tradename "Hastelloy Alloy B" (DIN designation NiMo30) and contains approximately 62% nickel, 26 to 30% molybdenum with the remainder small amounts of the elements cobalt, silicon, manganese, iron, carbon and vanadium.

In the device shown in FIG. 2, the continuous precipitation of the niobium tin layer is effected through a quartz tube 21, provided with a graphite sealing disc 22 for the coating chamber 24. The latter is connected via a quartz pipe 29 with another quartz tube 30 which is divided by means of a quartz wall 31. One part 32 of the tube 30 contains the niobium supply 33 and while the device is in operation serves as a niobium chlorinator. The other part 34 of the tube 30 contains the tin supply 35 and while the device is in operation, serves as a tin brominator. At both ends of tube 30 are nozzles 36 for chloride, and 37 for bromide. A bromide evaporator similar to that shown in FIG. 1 may be provided at the extension 37 for the purpose of producing bromine gas. Behind the niobium supply 33, another extension 38 is provided at portion 32 of the pipe 30. The quartz wall 31 prevents the flowing in of gas from portion 32 of pipe 30, into portion 34 and vice versa.

Both ends of quartz tube 21 are sealed with graphite bodies 39 and 40 which are provided with an opening as small as possible for passing through the tape-like carrier 41. The carrier 41 is unwound from the roll 42 and is picked up on rewind roll 43 driven by a motor. The carrier 41 maintains a conductive connection with graphite bodies 39 and 40, which are connected to an electric current source, via conductors 44 and 45. Nozzle 46 is used to introduce hydrogen into the second coating chamber 24. The exhaust gases occurring during the coating process are removed from coating chambers 23 and 24 by nozzles 47 and 48. The quartz tubes 21, 29 and 30, as well as the chamber 26, are surrounded by appropriately formed, for example hinged, tubular furnaces 49 which help to heat the individual parts of the device.

To effect the coating of the "Hastelloy Alloy B" tape, a niobium supply 33 is introduced into the niobium chlorinator 32 and a tin supply into the tin brominator 34. Also, the tape 41 to be coated is properly inserted into the quartz tube 21 and pulled through the pipe at a constant speed. Electric current which is conducted through the band 41, via leads 44 and 45, is such that the band is heated to approximately 900 to 1000° C. The tubular furnaces 49 heat the wall of the coating chamber 24 to about 700° C., the niobium chlorinator 32 to about 900° C., the tin brominator 34 to about 800° C. and the tube 29 to about 650° C., for the purpose of avoiding a condensation of the halides.

After the air is expelled from the device, for example through the introduction of an inert gas, the niobium tin layer is precipitated upon band 41 through the introduction of chlorine gas into the niobium chlorinator 32, through nozzle 36, and bromine gas into the tin brominator 34, through nozzle 37. During the passage of chlorine gas across the heated niobium 33, gaseous niobium chloride is formed and during the passage of the bromine gas over the molten tin 35, gaseous tin bromide is formed. Furthermore, chlorine gas may be introduced, behind the niobium supply 33, into the niobium chlorinator 32, via nozzle 38. This chlorine gas serves for a partial conversion of the niobium tetrachloride into niobium pentachloride. The gaseous niobium and tin halides flow through the pipe 29, into the coating chamber 24. Hydrogen is simultaneously supplied to the coating chamber 24 via nozzle 46. Hydrogen chloride is added to the hydrogen. The hydrogen reduces the niobium chloride and the tin bromide at the heated tape 41 and the latter is coated with an $Nb_3Sn$ layer. The coated tape is drawn out of the quartz tube 1 and is wound upon the motor driven roller 43.

The amount of gas per time unit needed during this continuous method depends upon the halogenation and reduction conditions, that is, upon the temperatures in the individual portions of the device, upon the pull-through velocity of the carrier tape and the desired thickness of the niobium tin layer to be produced upon the carrier. In the example, the niobium chlorinator 32 and the tin brominator 34 were about 40 cm., respectively, and the tube 29 was approximately 20 cm. long. The length of the coating chamber 24 was about 30 cm. Tubes 21, 29 and 30 were all of the same diameter, i.e. about 4 cm. The chlorine gas throughput through the niobium chlorinator 32 was about 4 l./h., the bromide throughput through the tin brominator 34 was about 2.2 l./h. The amount of chlorine gas introduced through the nozzle 38 was approximately 0.5 l./h. i.e. about 10% of the amount of chlorine gas introduced through nozzle 36. About 10 l./h. hydrogen was used to reduce the halides in the coating chamber 24. About 2 l./h. of chlorine gas was added to the hydrogen. The band 41, which was 50$\mu$ thick and 0.2 cm. wide was pulled at a speed of about 3 mm./sec. through the pipe 21. The niobium tin layer precipitated upon band 61 in coating chamber 24 had a thickness of about 8$\mu$. The properties of this superconducting band and the advantages of the production method correspond to those of FIG. 1.

These additional and beneficial steps may be added to the method of the present invention for producing layers of the intermetallic superconducting compound niobium tin ($Nb_3Sn$) upon a carrier of a metal which is high-temperature resistant or upon a high-temperature resistant metal alloy, through a reduction of the halides of niobium and tin, by means of hydrogen, at a heated carrier:

First, a gaseous niobium chloride and hydrogen are brought into contact with the heated carrier and precipitated upon the same through a reduction of the niobium chloride of a niobium layer, whereupon a niobium tin layer is precipitated on said niobium layer.

The first produced niobium layer prevents the formation of a reaction zone, between the carrier and the niobium tin layer. This is due to the reaction inertia of the niobium and prevents the indiffusion of components of the carrier into the niobium tin layer.

During the coating with a niobium underlayer of wire- or tape-shaped carriers, it is preferred to proceed in a manner whereby the carrier is first guided through a first coating chamber, wherein the precipitation of the niobium layer is effected, following which the niobium tin layer is precipitated upon said niobium layer, in a second coating chamber. Such a device is seen in aplication Ser. No. 713,344 of Kim. This mode of operation is particularly suitable for continuous coating of wires or tapes which are very long. However, it is also possible to arrange the carrier in a coating chamber into which a gaseous niobium chloride is introduced, for the purpose of forming a niobium layer, and is then reduced at the heated carrier by hydrogen. Subsequently, a gaseous tin bromide is added to the coating chamber in addition to the niobium chloride. The niobium tin layer is thus precipitated upon the niobium layer. This embodiment of the method, during which the entire coating process takes place in a coating chamber, is particularly suitable for the production of individual superconducting components, e.g. metal laminates with niobium tin layers, or of hollow cylinders with niobium tin layers, which may be used for shielding or for trapping magnetic fields.

We claim:

1. The method of producing layers of the intermetallic superconducting compound niobium tin ($Nb_3Sn$) upon a carrier, which comprises passing chlorine gas across heated niobium to produce gaseous niobium tetrachloride, separately therefrom passing bromine gas across heated tin to produce tin dibromide and subsequently mixing and reducing the halogens by hydrogen upon a heated carrier within a reaction vessel.

2. The method of claim 1, wherein the niobium is heated to 800 to 1000° C.

3. The method of claim 2, wherein the niobium is heated to about 950° C.

4. The method of claim 1, wherein the tin is heated to 700 to 900° C.

5. The method of claim 4, wherein the tin is heated to about 800° C.

6. The method of claim 1 wherein the carrier is heated to a temperature of about 900 to 980° C.

7. The method of claim 1, wherein the ratio of the amounts of tin dibromide and niobium tetrachloride is approximately one.

8. The method of claim 1, wherein the halides are reduced, after an addition of hydrogen chloride gas, by hydrogen.

9. The method of claim 1, wherein at least part of the niobium tetrachloride, prior to admixture with the tin dibromibe, is converted into niobium pentachloride by adition of chlorine.

References Cited

UNITED STATES PATENTS

| | | | |
|---|---|---|---|
| 3,472,694 | 10/1969 | Hanak | 117—107.2X |
| 3,425,825 | 2/1969 | Wilhelm | 117—107.2X |
| 3,420,707 | 1/1969 | Hanak | 117—107.2X |
| 3,268,362 | 8/1966 | Hanak et al. | 117—107.2X |

ALFRED L. LEAVITT, Primary Examiner

A. GRIMALDI, Assistant Examiner

U.S. Cl. X.R.

117—107.2